Nov. 24, 1964 H. V. MARTIN 3,158,387
EXTENSIBLE DRAW BAR
Filed Oct. 2, 1962

INVENTOR.
Hiram V. Martin
BY George M. Anderson.
ATTORNEY

3,158,387
EXTENSIBLE DRAW BAR
Hiram V. Martin, 1321 N. Riverside Ave.,
Medford, Oreg.
Filed Oct. 2, 1962, Ser. No. 227,923
1 Claim. (Cl. 280—478)

The invention relates to extensible and retractible draw bars or tongues of trailers, or to a draft hitch, involving two interfitting sections slidably engaging each other, the inner section having two diametric apertures longitudinally spaced apart, the outer section having one diametric aperture adapted to be aligned with either of said two apertures, and a locking bolt normally engaging the aperture of the outer section and one of the apertures of the inner section aligned therewith, said bolt being adapted to lock the section together in retracted relationship said bolt being adapted to engage the aperture of the outer section aligned with the other aperture of the inner section to lock the sections together in extended relationship.

An object is to provide a spring pressed locking bolt with manipulatable means for withdrawing it from its locking engagement with the aligned apertures in which the withdrawal means is held in any of its withdrawn positions, that is to say partially or entirely withdrawn; without the attention of the operator being necessarily given thereto; in which it is made possible to compress a much more powerful spring, thereby lessening any tendency of the locking bolt becoming accidentally disengaged; the invention is self contained and requires no additional linkage or tools to operate it; the invention is easily operated even by a child, the invention is simple, positive and inexpensive, and the invention can be installed on any extensible draw bar or trailer tongue by simple drilling and welding.

Other objects and advantages will appear hereinafter or will be obvious.

The invention consists in the novel construction and combinations of parts hereinafter set forth in the claims.

Figure 1:
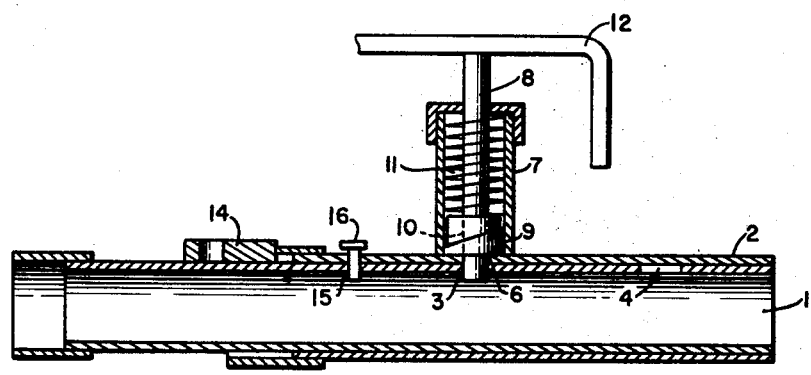
Figure 2:
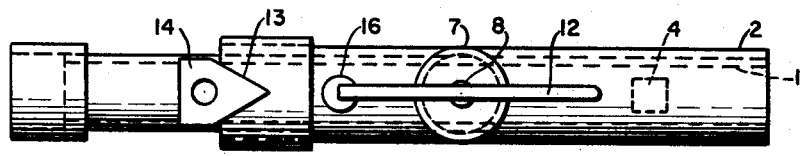
Figure 3:
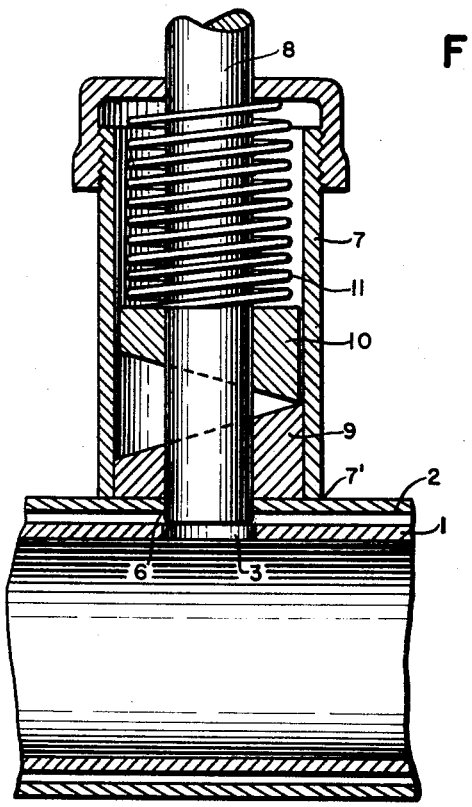
Figure 4:
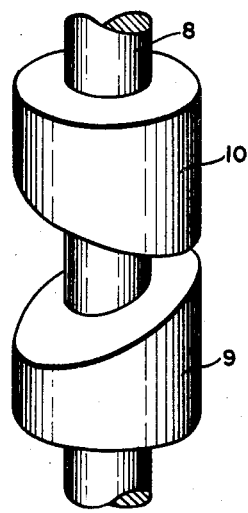

In the accompanying drawings:

FIGURE 1 is a central longitudinal section of the extensible draw bar in retracted position, the upper cam being in normal lower position, FIGURE 2 is a plan view of the same, FIGURE 3 is a central fragmentary longitudinal section on a larger scale, the upper cam and the locking bolt being in raised position, and FIGURE 4 is a perspective view of the two cams, the upper cam being in raised position.

Referring to the drawings, the numerals 1 and 2 designate inner and outer interfitting sections slidably engaging each other of an extensible draw bar or tongue of a trailer (not shown) the inner section having two diametric apertures 3 and 4, longitudinally spaced apart, the outer section having one diametric aperture 6 adapted to be aligned with either of said two apertures.

A vertically directed sleeve 7 is fixedly connected or welded to the outer section at 7', a reciprocatory bolt 8 working in said sleeve, said bolt normally engaging the aperture of the outer section and one of the two apertures of the inner section to lock the sections together in contracted relationship, said bolt being adapted to engage the aperture of the outer section and the other aperture of the inner section to lock the sections together in extended relationship.

A lower cam 9 in said sleeve is fixedly connected or welded thereto, an upper cam 10 in said sleeve, being fixedly connected or welded to said bolt. Said upper and lower cams each plane surfaced at a comparatively low angle to the horizontal of approximately twenty-three degrees. This angle may be modified to not more than thirty degrees for an operative device. Said cams have their highest and lowest points diametrically opposite, the upper cam being rotatable 180 degrees or a half turn to withdraw the bolt from the aligned apertures of the sections. In this operation, the peripheral edge of the upper cam rides upon the peripheral edge of the lower cam during the bolt withdrawal, whereby the bolt is automatically held partially or completely withdrawn against the tension of the spring during its withdrawal without attention of the operator thereto.

A coiled spring 11 is located in said sleeve for pressing said cams together in contact and for exerting tension upon said bolt to hold its locking engagement with said apertures, said upper cam being rotatable upon the lower cam to raise the upper cam and said bolt therewith, to withdraw said bolt from said apertures.

Manipulatable means are provided for rotating the upper cam consisting of a handle extension 12 of said bolt, said upper cam being thereby rotatable 180 degrees to effect said bolt withdrawal and rotatable reversely 180 degrees to restore said cam and said bolt to normal position.

In operation the bolt being withdrawn from the apertures, will ride upon the periphery of the inner section during said extension, and will by gravity and under the influence of said spring automatically engage said other aperture of the inner section to lock the inner and outer section together in extended relationship.

The outer section is provided at one end thereof with a notch 13, the inner section having a locator 14 engagable with said notch to normally align one of the apertures of the inner section with the aperture of the outer section.

The inner and outer sections are provided with safety bolt holes 15 adapted to be normally aligned, and with a safety bolt 16 engagable with the aligned holes, at which time the locator is in engagement with said notch.

The right is reserved to modifications coming within the scope of the claim.

I claim:

An extensible drawbar comprising inner and outer tubular interfitting horizontally directed sections slidably engaging each other, the inner section having two diametric apertures longitudinally spaced apart from each other, the outer section having one diametric aperture adapted to be aligned with either of said two apertures, a vertically directed sleeve fixedly connected to said outer section, a reciprocatory bolt working in said sleeve, said bolt normally engaging the aperture of the outer section and one of the two apertures of the inner section, to lock the sections together in contracted relationship and being adapted to engage the aperture of the outer section and the other aperture of the inner section to lock the sections together in extended relationship, a lower cam in said sleeves fixedly connected thereto, an upper cam in said sleeve fixedly connected to said bolt, and a coiled spring in said sleeve tensioned to press said cams together and to exert tension upon said bolt to hold its locking engagement with said apertures, characterized in that said upper and lower cams are each plane-surfaced, each of said planes being oriented at a comparatively low angle to the horizontal of approximately twenty-three degrees and having their highest and lowest points diametrically opposite, the upper cam being rotatable 180 degrees upon the lower cam to withdraw said bolt from said apertures, the peripheral edge of the upper cam riding upon the peripheral edge of the lower cam during said bolt withdrawal, whereby said bolt is automatically held partially or completely withdrawn against the tension of said spring during its withdrawal without attention of the operator.

References Cited by the Examiner
UNITED STATES PATENTS

| | | |
|---|---|---|
| 701,238 | 5/02 | Williams. |
| 2,512,836 | 6/50 | Olson et al. _____ 280—482 |
| 2,810,589 | 10/57 | Tarleton _____ 280—478 X |
| 2,925,287 | 2/60 | Morris _____ 280—482 |

A. HARRY LEVY, *Primary Examiner.*

LEO FRIAGLIA, *Examiner.*